United States Patent
Sasaki (10) Patent No.: US 7,340,755 B2
(45) Date of Patent: Mar. 4, 2008

(54) DISC DRIVE APPARATUS

(75) Inventor: Yuichi Sasaki, Saitama (JP)

(73) Assignee: Sony Corporation (JP)

( * ) Notice: Subject to any disclaimer, the term of this patent is extended or adjusted under 35 U.S.C. 154(b) by 143 days.

(21) Appl. No.: 11/171,552

(22) Filed: Jun. 30, 2005

(65) Prior Publication Data

US 2006/0010460 A1    Jan. 12, 2006

(30) Foreign Application Priority Data

Jul. 6, 2004    (JP)    ............ P2004-199502

(51) Int. Cl.
*G11B 17/04*    (2006.01)
(52) U.S. Cl. ........................... 720/655
(58) Field of Classification Search .......... 720/655,
720/612, 647, 600, 613, 619, 623; 369/75.11,
369/75.21; 360/99.01
See application file for complete search history.

(56) References Cited

U.S. PATENT DOCUMENTS

| | | | | |
|---|---|---|---|---|
| 4,412,260 | A * | 10/1983 | Stricklin et al. | 360/99.06 |
| 5,852,594 | A * | 12/1998 | Kaise et al. | 720/647 |
| 6,028,832 | A * | 2/2000 | Hojo et al. | 720/647 |
| 6,169,720 | B1 * | 1/2001 | Kamemura et al. | 720/605 |
| 6,212,147 | B1 * | 4/2001 | Ishihara | 720/612 |
| 6,704,264 | B2 * | 3/2004 | Liao et al. | 720/609 |
| 6,785,896 | B2 * | 8/2004 | Huang | 720/600 |
| 6,946,971 | B2 * | 9/2005 | Matumoto et al. | 340/825.72 |

FOREIGN PATENT DOCUMENTS

| | | |
|---|---|---|
| JP | 2000-149365 | 5/2000 |
| JP | 2001-184836 | 7/2001 |
| JP | 2003-223754 | 8/2003 |

* cited by examiner

*Primary Examiner*—Tianjie Chen
(74) *Attorney, Agent, or Firm*—Lerner, David, Littenberg, Krumholz & Mentlik, LLP (57) ABSTRACT

A disc drive apparatus having a simple configuration and allowing a user to put a disc into and take it out from the apparatus with ease includes a lid and a tray incorporated into a cabinet of a disc drive, so as to be able to turn and, when the lid is opened or closed relative to the cabinet, a pair of tray-interlocked pivots are forced to slide in respective guide grooves so as to transmit the force applied to the lid to the tray by way of the tray-interlocked pivots and the guide grooves. With this arrangement, the tray can be turned with the lid in an interlocked manner. Thus, a lower part of the tray edges out forwardly and the tray is turned slightly upward when the lid is opened, whereas the lower part of the tray is moved backward to restore the original position where it substantially vertically stands when the lid is closed.

7 Claims, 5 Drawing Sheets

DISC DRIVE APPARATUS

CROSS REFERENCES TO RALATED APPLICATIONS

The present invention contains subject matter related to Japanese patent Application JP2004-199502 filed in the Japanese patent Office on Jul. 6, 2004, the entire contents of which being incorporated herein by reference.

BACKGROUND OF THE INVENTION

1. Field of the Invention

This invention relates to a disc drive apparatus that can typically be applied to a CD player adapted to replay a disc in a state where the disc surfaces are held vertically.

2. Description of the Related Art

CD players having a standing type disc drive and adapted to replay music by reading data in a state where the disc surfaces are held vertically are known.

Such CD players are so designed that the user may be required to open the lid that protects the disc drive of the player first and subsequently put a disc in position or take it out in a state where the disc is held vertically.

There have been proposed CD players in which the tray for receiving a disc and holding it in position is driven to move forward and tilted slightly upward by the drive force of a motor so that the user can put a disc in position or take it out with ease when the lid is opened (see, for example, Japanese Patent Application Laid-Open No. 2003-223754 [pp. 6-8, FIGS. 12-20]).

SUMMARY OF THE INVENTION

However, such CD players are accompanied by a problem that they inevitably have a complex structure because the lid and the tray are driven by a combination of a drive motor and a large number of gears.

The present invention has been made in view of the above-identified circumstances, and intends to provide a disc drive apparatus that is structurally simplified and allows the user to put a disc in position and take it out with ease.

According to the one embodiment of the present invention, there is provided a disc drive apparatus having disc holding mechanism rotatably supported relative to a cabinet and adapted to hold a disc recording medium and a lid supported relative to the cabinet so as to be opened and closed freely and adapted to protect the disc holding mechanism in the closed state thereof, the lid being provided with opening/closing motion transmitting mechanism for transmitting the opening/closing motion of the lid to the disc holding mechanism, the disc holding mechanism being provided with lid turning mechanism for receiving the opening/closing motion of the lid transmitted thereto by way of the opening/closing motion transmitting mechanism and driving the disc holding mechanism to turn and move outward as a motion interlocked with the opening motion of the lid and inward as a motion interlocked with the closing motion of the lid.

With the above-described arrangement, it is possible to transmit the force applied to the lid to open or close the lid relative to the cabinet to the disc holding mechanism. Thus, it is possible to drive the disc holding mechanism to turn and move outward as a motion interlocked with opening motion of the lid and inward to a storage position as a motion interlocked with the closing motion of the lid without requiring any other driving force.

Thus, according to the invention, the force applied to the lid to open or close the lid is transmitted to the disc holding mechanism and hence it is possible to drive the disc holding mechanism to turn and move outward as a motion interlocked with opening motion of the lid and inward to a storage position as a motion interlocked with the closing motion of the lid without requiring any other driving force. Therefore, there is provided a disc drive apparatus having a simple configuration and allows the user to put a disc in position and take it out with ease.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Now, a preferred embodiment of the present invention will be described in greater detail by referring to the accompanying drawings.

(1) Overall Configuration of CD Player

Figure 1:
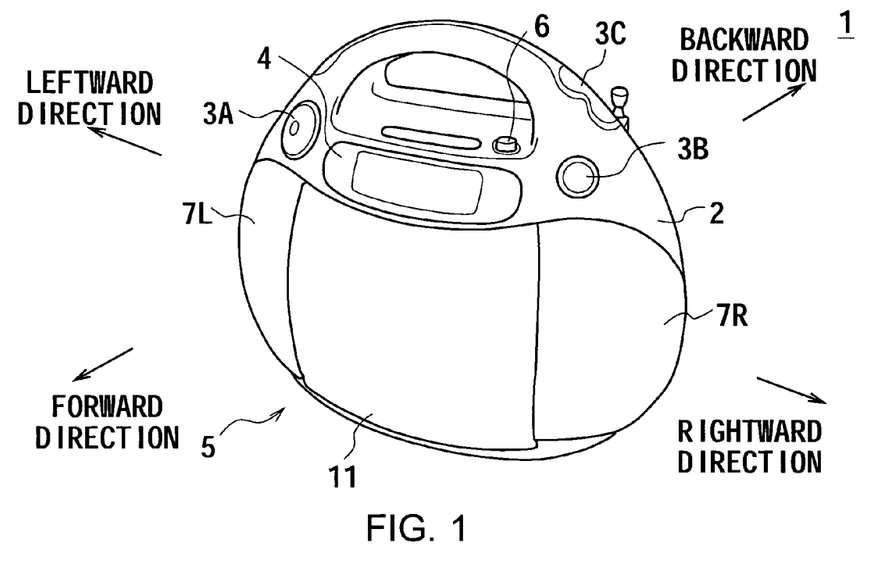
FIGS. 1 and 2 are schematic perspective views of an external configuration of a CD player with a disc drive according to one embodiment of the invention (1) and (2)
Figure 2:
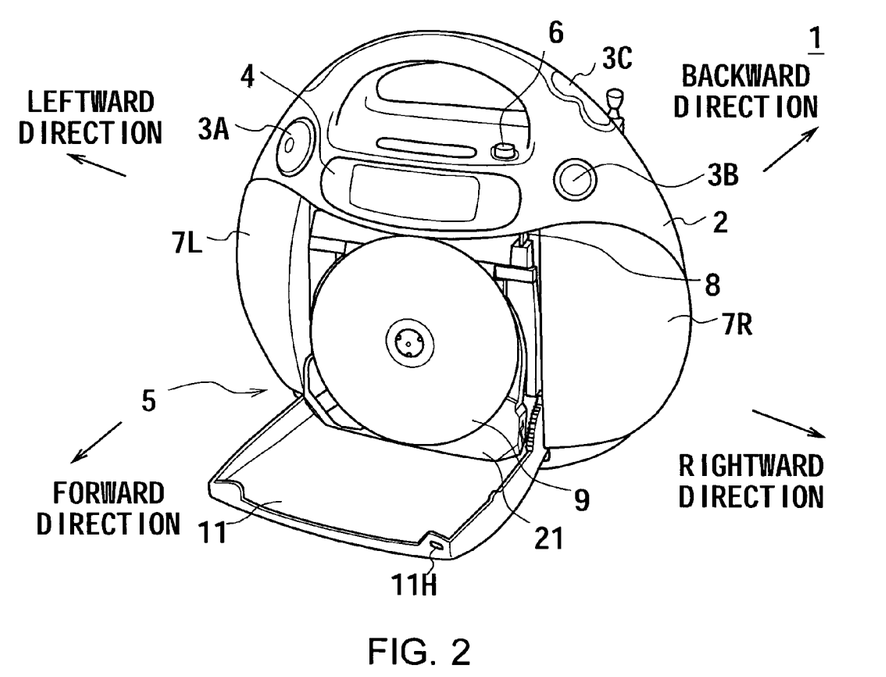

Referring to FIGS. 1 and 2, reference numeral 1 generally shows a CD player having a disc drive according to one embodiment of this invention. It receives radio waves or replays a compact disc (CD), and output the sounds of the radio waves or those reproduced by replaying the CD.

The CD player 1 has a cabinet 2 as a principal component thereof. The cabinet 2 is provided with operation switches 3A, 3B, 3C for conducting various operations, a display section 4 for displaying the reception frequency of the radio wave that the CD player is turned in, playback time of a CD and the like, a disc drive 5 for driving a disc 9, a lid button 6 for opening the lid 11 of the disc drive 5 and left and right speakers 7L, 7R for outputting sounds.

The CD player 1 is a so-called portable CD player and a handle is arranged on the cabinet 2 so that the user can carry the CD player with ease by holding the handle by hand.

As shown in FIG. 2, the disc drive 5 is a so-called standing type disc drive adapted to receive a disc 9 with its surfaces held in a substantially vertically standing state. If compared with a so-called horizontal type disc drive, the CD player 1 has a reduced width in terms of the distance between the front end and the rear end thereof so as to reduce the area it occupies on a desk or a table where it is placed.

As the lid 11 of the disc drive 5 of the CD player 1 is closed (FIG. 1), a lid locking claw 8 (FIG. 2) is engaged with a lock hole 11H of the lid 11 so as to hold the lid 11 in a closed state. As lid button 6 is depressed, the CD player 1 drives the lid locking claw 8 to move downward so that the lid locking claw 8 is released from the engagement with the lock hole 11H of the lid 11 and the lid 11 is turned forward to become opened (FIG. 2).

On the other hand, as the lid 11 of the CD player 1 is turned and pushed back to the closed position manually by the user from the open state (FIG. 2), the lid locking claw 8 becomes engaged with the lock hole 11H again so that the lid 11 is put back to the closed state (FIG. 1).

In the following description, the lid is opened toward the front side and pushed back toward the rear side of the CD player 1, while the right and left sides of the CD player 1 are the user's right and left sides when the user faces the CD player 1.

(2) Configuration of Disc Drive

Figure 3:
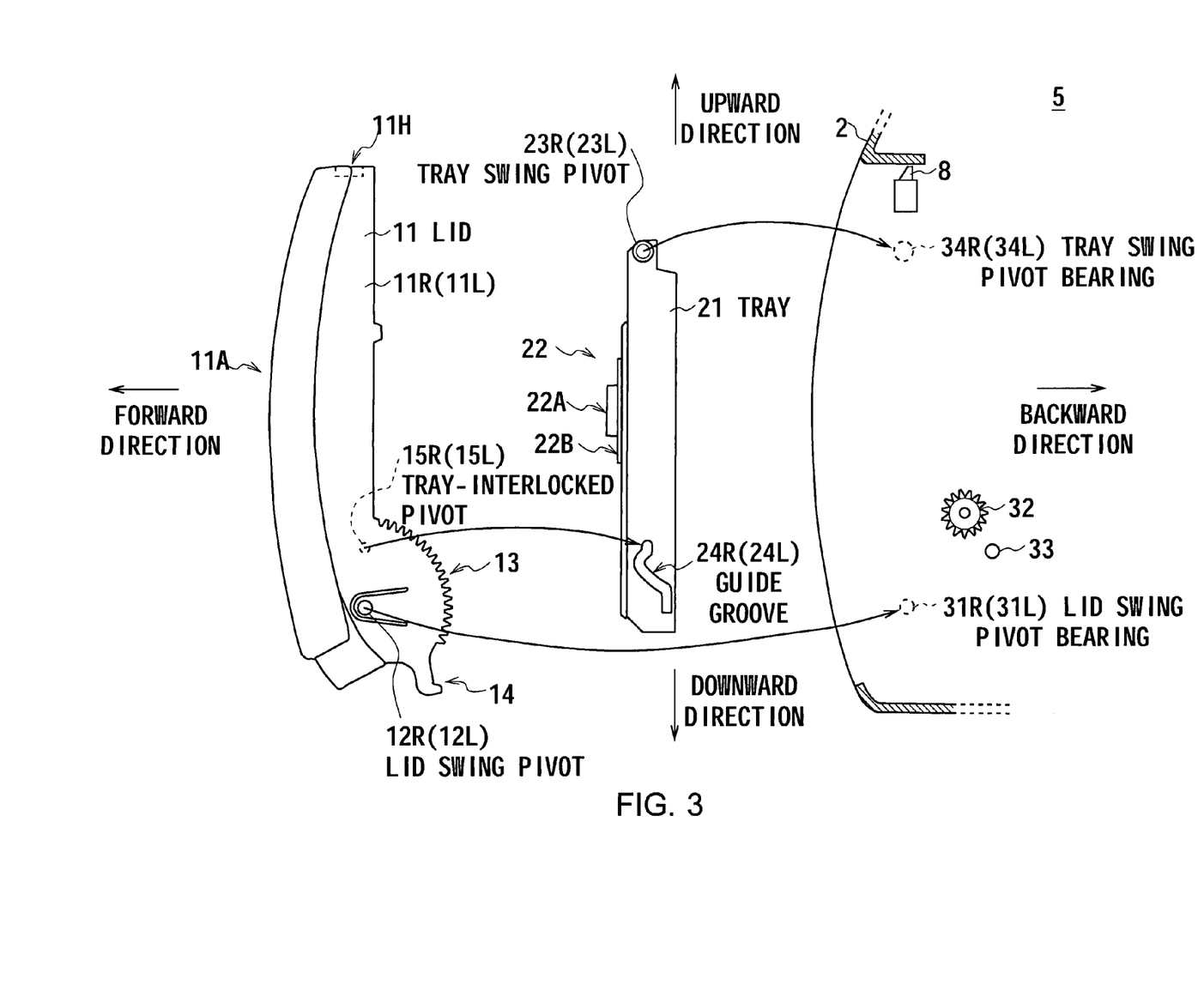
FIGS. 3 and 4 are schematic side and perspective views of the disc drive (1) and (2)
Figure 4:
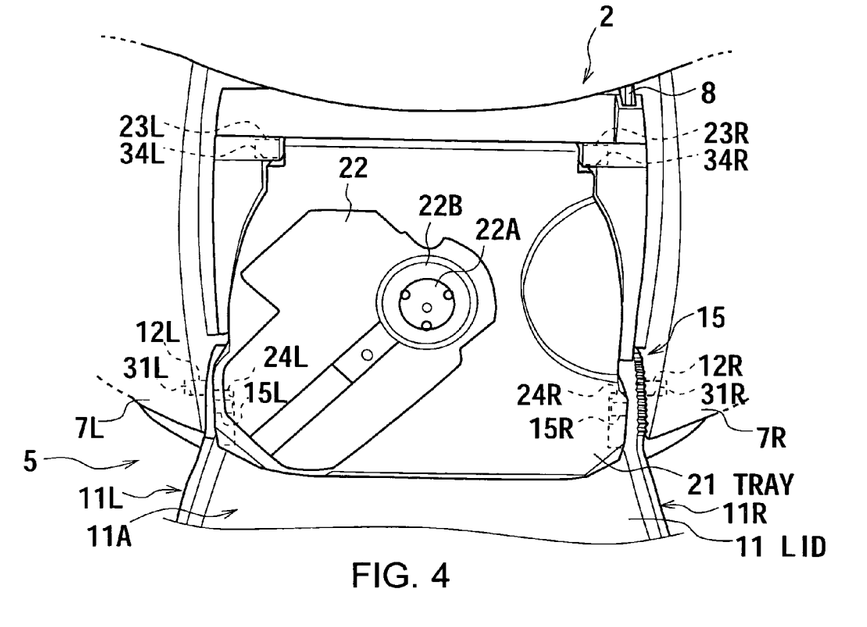

As shown in FIGS. 3 and 4, the disc drive 5 includes the lid 11 and a tray 21. While FIG. 3 is a right lateral side view as a whole, it shows the cabinet 2 in cross section for the purpose of easy understanding of the following description. FIG. 4 is a partial front view of the CD player 1 with the lid 11 wide open.

The cabinet 2 has a space defined by the lid 11 and the tray 21. When the lid 11 is closed (FIG. 1), the tray 21 is contained in the inside and the front surface of the tray 21 is covered by the lid 11.

A rotary damper 32 that exerts resisting force in the sense of rotation of the CD put on the tray 21 and a substantially cylindrical stopper 33 are arranged on the inner right lateral surface of the cabinet 2.

The lid 11 is made of synthetic resin such as acrylonitril butadiene styrene (ABS) as a one piece and includes a substantially rectangular plate-like front surface section 11A that rises forward at the center thereof to show a curved profile, a left lateral surface section 11L and a right lateral surface section 11R, the lateral surface sections 11L and 11R extending backward respectively from the left and right lateral edges of the front surface section 11A.

The lid 11 has lid swing pivots 12L and 12R around which the lid 11 turns, the lid swing pivots 12L and 12R being arranged symmetrically respectively at an outer lower position of the left lateral surface section 11L and at an outer lower position of the right lateral surface section 11R. Thus, the lid 11 can turn around the lid swing pivots 12L and 12R when the lid swing pivots 12L and 12R are put into respective lid swing pivot bearings 31L and 31R that are formed on the inner left and right lateral surfaces of the cabinet 2 respectively.

Note that the lid 11 is urged forward by a lid spring (not shown) and hence, as the lid button 6 of the CD player 1 (FIG. 1) is depressed to open the closed lid 11 and the lid locking claw 8 is released from the engagement with the lock hole 11H of the lid 11, it is turned forward by the urging force of the lid spring.

The lid 11 also has a gear section 13 at the right lateral surface section 11 and the gear section 13 is engaged with the rotary damper 32 fitted to the cabinet 2 to suppress the rotary speed of the lid 11 that turns around the lid swing pivots 12L and 12R.

Additionally, the lid 11 has a stopper abutting section 14 below the gear section 13 and at the right lateral surface section 11R. When the lid 11 is turned around the lid swing pivots 12L and 12R by a predetermined angle and hence the lid 11 is opened by the predetermined angle, the stopper abutting section 14 hits the stopper 33 of the cabinet 2 to limit the turning motion of the lid 11 and prevent the lid 11 from opening further.

The lid 11 is provided with substantially cylindrical tray-interlocked pivots 15L and 15R that are arranged symmetrically and internally relative to the left lateral surface section 11L and the right lateral surface section 11R respectively. Thus, as the lid 11 is turned, the tray-interlocked pivots 15L and 15R are turned integrally with the lid 11 around the lid swing pivots 12L and 12R (as will be described in greater detail hereinafter).

On the other hand, the tray 21 has a flat and substantially box-like profile and has a disc drive section 22 that drives to rotate the disc 9 (FIG. 2) loaded by the user to read out the music data.

The disc drive section 22 has a disc-chuck section 22A into which a ball chucking mechanism is incorporated. Thus, as the user puts a disc 9 into the CD player 1 and pushes it against the disc rotating table 22B with the center hole of the disc 9 aligned with the disc chuck section 22A, the disc 9 is rigidly held to the disc rotating table 22B by the ball chucking mechanism. As a result, the disc drive section 22 can rotate the disc 9 integrally with the disc chuck section 22A and the disc rotating table 22B.

The tray 21 also has left and right tray swing pivots 23L and 23R around which the tray 21 is turned, the tray swing pivots 23L and 23R being arranged symmetrically respectively at an outer upper position of the left lateral surface section 11L and at an outer upper position of the right lateral surface section 11R. Thus, tray 21 can turn around the tray swing pivots 23L and 23R when the tray swing pivots 23L and 23R are put into respective tray swing pivot bearings 34L and 34R that are formed on the inner left and right lateral surfaces of the cabinet 2 respectively.

Additionally, the tray 21 has cam-shaped guide grooves 24L and 24R arranged symmetrically respectively at a lower left lateral position and at a lower right lateral position of the tray 21. Thus, as the tray-interlocked pivots 15L and 15R of the lid 11 are put respectively into the guide grooves 24L and 24R, they can slide respectively on the inner surfaces of the guide groves 24L and 24R.

Note that the guide grooves 24L and 24R have a groove width slightly greater than the diameter of the cylindrical parts of the tray-interlocked pivots 15L and 15R so that the tray-interlocked pivots 15L and 15R may slide smoothly without jar and jolt.

With the above arrangement, the tray-interlocked pivots 15L and 15R slide on the inner surfaces of the respective guide grooves 24L and 24R or apply force to the inner surfaces of the respective guide grooves 24L and 24R to transmit force to the tray 21 when it is turned integrally with the lid 11.

Since the tray 21 is adapted to turn around the tray swing pivots 23L and 23R, the tray 21 turns forward or backward as force is applied in that direction to the inner surfaces of the guide grooves 24L and 24R that are located at lower positions of the tray 21.

Thus, as the lid 11 is turned around the lid swing pivots 12L and 12R to open or close by the urging force of the lid spring or the manually applied force of the user, whichever appropriate, the disc drive 5 transmits the force to the tray 21 by way of the tray-interlocked pivots 15L and 15R and the guide grooves 24L and 24R to turn the tray 21 around the tray swing pivots 23L and 23R.

(3) Interlocked Motion of Lid and Tray

Now, how the lid 11 and the tray 21 are moved in an interlocked manner in the disc drive 5 will be described below. Since the guide groove 24L formed on the left lateral surface of the tray 21 and the guide groove 24R formed on the right lateral surface of the tray 21 are symmetrically arranged, the interlocked motion of the lid 11 and the 21 will be described only by referring to a right lateral view thereof.

Figure 5:
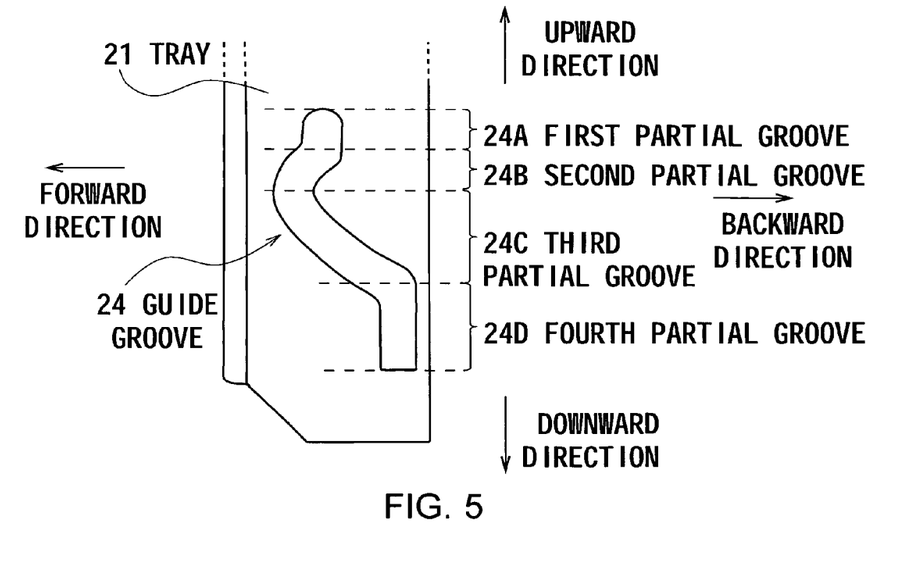
FIG. 5 is an enlarged schematic side view of a guide groove.

Referring to FIG. 5 that is an enlarged right lateral partial view of the tray 21, the guide groove 24 is divided into a first partial groove 24a, a second partial groove 24b, a third partial groove 24c and a fourth partial groove 24d.

The guide groove 24 extends substantially vertically downward in the first partial groove 24a from the top end thereof and then shows a forwardly curved and arc-shaped profile in the second partial groove 24b. Then, it extends further downward to show a mildly curved profile in the third partial groove 24c and then substantially vertically downward in the fourth partial groove 24d to the bottom end thereof.

As pointed out above, the tray-interlocked pivot 15 of the lid 11 is turned around the lid swing pivot 12 and slides in the guide groove 24 as the lid 11 is turned by the urging force of the lid spring and the gravity it receives. However, since the first through fourth partial grooves 24a through 24d have different respective profiles, it applies force to the first through fourth partial grooves 24a through 24d differently.

Therefore, the states where the tray-interlocked pivot 15 is located respectively in the first through fourth partial grooves 24a through 24d are referred to as the first through fourth sates and each of the states will be discussed below.

(3-1) First State

Figure 6:
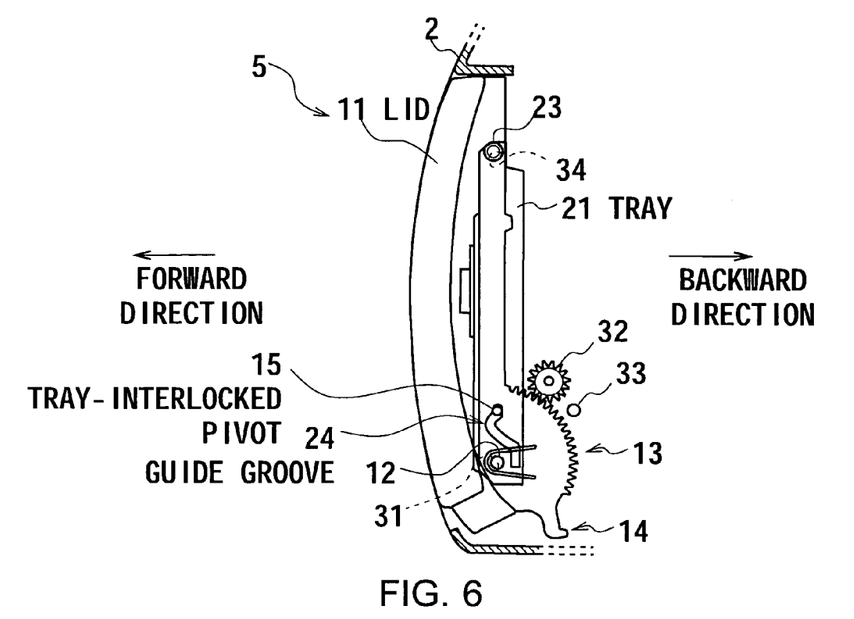
FIGS. 6 to 9 are schematic side views showing the first to fourth states.

The disc drive 5 is in the first state when the lid 11 is completely closed as shown in FIG. 6. Then, in this state, the tray 21 is standing substantially vertically and the tray-interlocked pivot 15 of the lid 11 is located in the first partial groove 24a of the guide groove 24.

Since the first partial groove 24a of the guide groove 24 extends substantially vertically downward from the top thereof as pointed out above (FIG. 5), it allows the tray-interlocked pivot 15 of the lid 11 to move freely up and down in the first partial groove 24a but it does not allow the tray-interlocked pivot 15 of the lid 11 to move forward and backward.

In other words, while the tray 21 having the guide groove 24 can turn around the tray swing pivot 23 in the first state, it is restricted by the tray-interlocked pivot 15 in terms of turning forward and backward.

On the other hand, the lid 11 is locked by the lid locking claw 8 (FIG. 3) in the first state and hence it is rigidly held to and may not be able to turn relative to the cabinet 2 so that the tray-interlocked pivot 15 is also held to the current position relative to the cabinet 2. Thus, the tray 21 is rigidly held to the cabinet 2 by the tray-interlocked pivot 15.

Thus, as the disc drive 5 rigidly holds the lid 11 to the current position in the first state, it also rigidly holds the tray 21 to the current position by way of the tray-interlocked pivot 15 and the first partial groove 24a of the guide groove 24 so as not to allow it to turn.

As a result, when the disc drive 5 drives the disc 9 (FIG. 2) to rotate and reads the music data stored on the disc 9, the tray 21 moves without jar and jolt so that it can stably and reliably reads the music data stored on the disc 9.

(3-2) Second State

Figure 7:
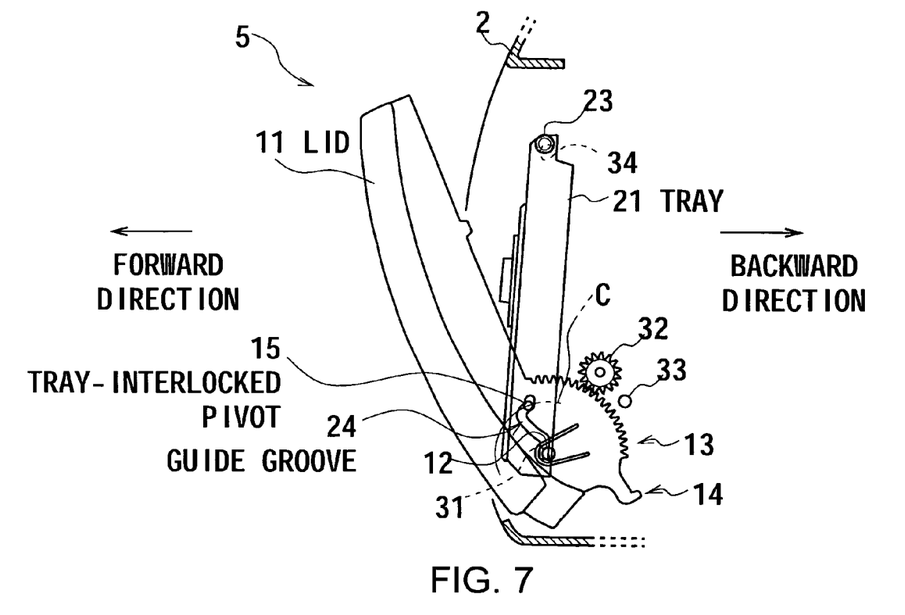

As the lid button 6 (FIG. 1) is depressed in the first state (FIG. 6) where the lid 11 is completely closed, the disc drive 5 is moved by the lid urging force into the second state where the lid 11 is slightly opened as shown in FIG. 7. At this time, the tray-interlocked pivot 15 of the lid 11 is located in the second partial groove 24b of the groove 24.

Note that the second partial groove 24b of the groove 24 has a forwardly curved and arc-shaped profile that extend from above to below as pointed out above (FIG. 5). More specifically, the second partial groove 24b shows a profile that substantially agrees with the locus C of movement of the tray-interlocked pivot 15 when the lid 11 is turned as shown in FIG. 7.

Thus, the second partial groove 24b of the guide groove 24 releases the tray-interlocked pivot 15 that is turned integrally with the lid 11 and hence it is substantially not subjected to any force exerted by the tray-interlocked pivot 15.

In other words, the disc drive 5 releases the tray-interlocked pivot 15, which is turned integrally with the lid 11, along the second partial groove 24b and does not substantially allow the tray to turn.

As a result, the disc drive 5 prevents a lower part of the tray 21 from edging out to interfere with the rear surface of the lid 11 when the lid 11 is slightly opened because it does not substantially allow the tray 21 to turn.

(3-3) Third State

Figure 8:
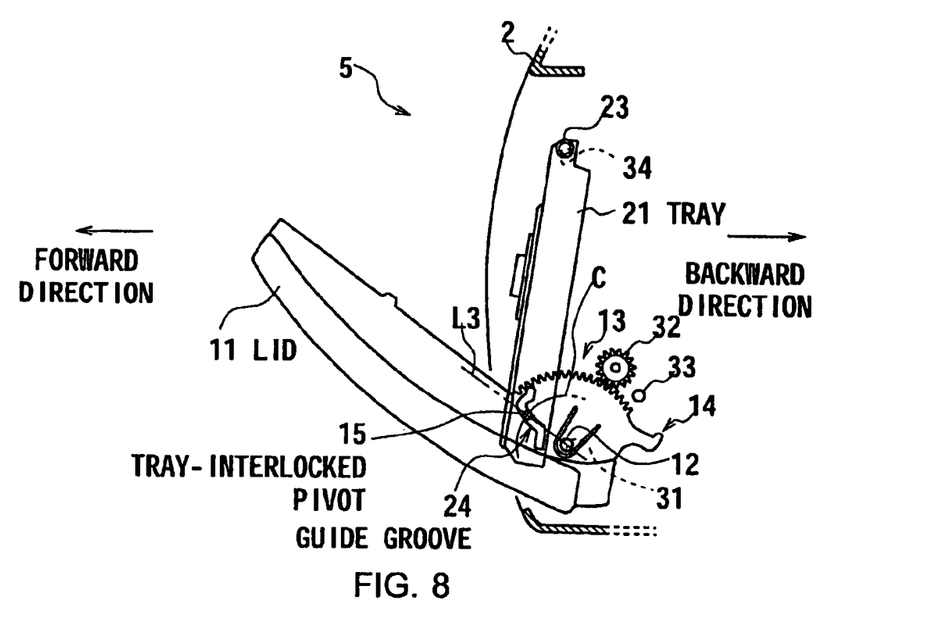

The lid 11 then moves from the second state, where it is lightly opened (FIG. 7) into the third state where it is opened further to a certain extent as shown in FIG. 8 as the disc drive 5 allows the lid 11 to keep on its opening motion due to the urging force of the lid spring and the gravity it receives. At this time, the tray-interlocked pivot 15 of the lid 11 is located in the third partial groove 24c of the guide groove 24.

As described above, the third partial groove 24c of the guide groove 24 has a mildly curved profile extending from above to below (FIG. 5). To be more accurate, the third partial groove 24c shows a profile that is substantially similar to straight line L3 passing through the center of the turning motion of the lid swing pivot 12 as shown in FIG. 8.

The straight line L3 passing through the center of the turning motion of the lid swing pivot 12 orthogonally intersects the locus C of movement of the tray-interlocked pivot 15, the third point 24c of the guide groove 24, which is substantially similar to the straight line L3, receives a force substantially perpendicular to it from the tray-interlocked pivot 15 when the lid 11 is turned.

At this time, the force trying to turn the tray-interlocked pivot 15 integrally with the lid 11 is sufficiently transmitted to the inner lateral surfaces of the third partial groove 24c so that the tray 21 is subjected to a forwardly directed large force and hence it is turned forward around the tray swing pivot 23 to a large extent.

In other words, as the lid 11 is turned in the third state, the disc drive 5 allows the tray 21 to turn to a large extent by transmitting the force trying to turn the lid 11 to the tray 21 by way of the tray-interlocked pivot 15 and the third partial groove 24c.

As a result, the disc drive 5 allows the tray 21 to forwardly move out by positively allowing it to turn in the third state where the lid 11 is opened to a certain extent.

(3-4) Fourth State

Figure 9:
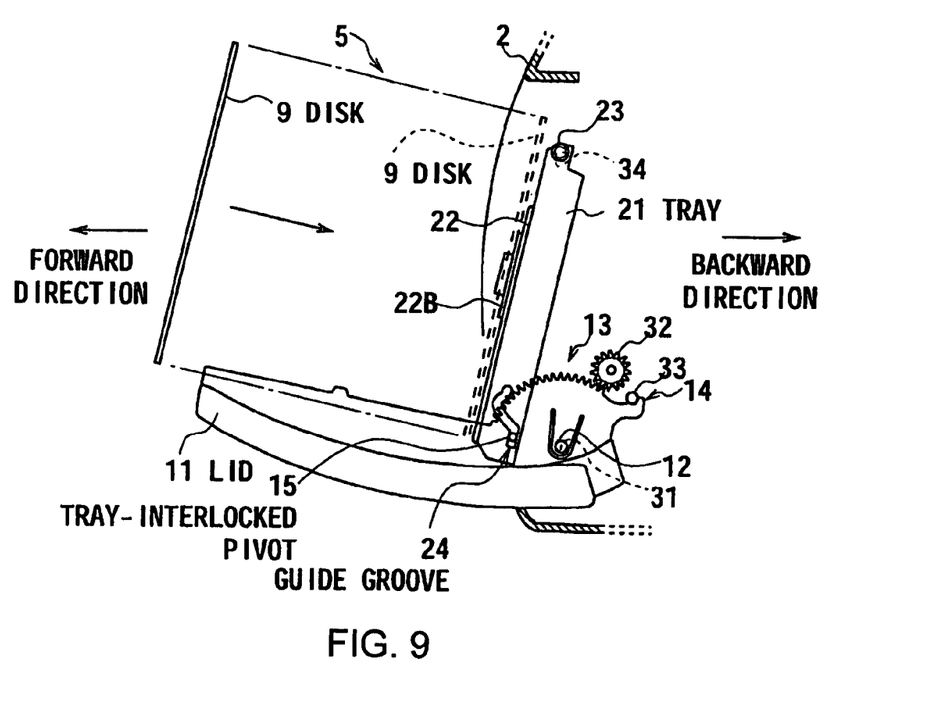

Then, the disc drive 5 allows the lid 11 to keep on opening further due to the urging force and the gravity it receives from the third state where the lid 11 is opened to a certain extent (FIG. 8) so that the stopper abutting section 14 of the lid 11 eventually hits the stopper 33 of the cabinet 2, when the lid 11 is moved into the fourth state where it is completely opened as shown in FIG. 9. At this time, the tray-interlocked pivot 15 of the lid 11 is located in the inside of the fourth partial groove 24d of the guide groove 24.

Since the fourth partial groove 24d of the guide groove 24 shows a linear profile extending substantially vertically downward from above to below as described earlier (FIG. 5), it allows the tray-interlocked pivot 15 of the lid 11 to move freely up and down in the fourth partial groove 24d but it does not allow the tray-interlocked pivot 15 of the lid 11 to move forward and backward like the first partial groove 24a.

In other words, as in the first state, while the tray 21 having the guide groove 24 can turn around the tray swing pivot 23 in the fourth state, it is restricted by the tray-interlocked pivot 15 in terms of turning forward and backward.

On the other hand, as the stopper abutting section 14 of the lid 11 is abutted against the stopper 33 of the cabinet 2 and subjected to the urging force of the lid spring and the gravity applied to it, it lies still in a completely open state relative to the cabinet 2. Therefore, the tray-interlocked pivot 15 also lies still relative to the cabinet 2.

In other words, as the disc drive 5 holds the lid 11 lying still in the fourth state, it holds the tray 21 lying still by way of the tray-interlocked pivot 15 and the fourth partial groove 24d of the guide groove 24.

Meanwhile, as the user puts a disc 9 into the disc drive section 22 (FIG. 4) of the tray 21 (FIG. 4), the disc drive 5 pushes the disc 9 against the disc rotating table 22B of the disc drive section 22.

At this time, tray 21 is subjected to a force pushing it substantially backward by way of the disc drive section 22. Then, the pushing force is transmitted to the tray-interlocked pivot 15 by way of the fourth partial groove 24d of the guide groove 24 so as to turn the tray-interlocked pivot 15 backward.

However, since the tray-interlocked pivot 15 lies still with the lid 11 and the fourth partial groove 24d of the guide groove 24 is substantially linear and extending vertically, it receives the backward pushing force without releasing it.

In other words, the disc drive 5 receives the force trying to push the disc 9 against the tray 21 that is exerted by the user without releasing it to keep the tray 21 in the fourth state where it is moved out forward (FIG. 9) and allow the user to put the disc 9 onto the disc rotating table 22B of the disc drive section 22 without difficulty.

Additionally, the disc drive 5 clears the locus of the disc 9 of any obstacles such as the lid 11 when the user moves the disc 9 along a normal line to the tray 21 in the fourth state.

Thus, when the user puts the disc 9 into the CD player 1, he or she can move it to approach the tray 21 along the normal line relative to the tray 21 and securely hold it onto the disc rotating table 22B simply by pushing the disc 9 against the tray 21 in the same direction.

Then, the user manually pushes an upper part of the lid 11 to turn the lid backward and close the lid 11 in the fourth state. At this time, the disc drive 5 follows the above sequence of operation reversely to move from the fourth state to the first state by way of the third and second states. Then, the tray 21 is turned gradually with the lid 11 in an interlocked manner and restores the first state (FIG. 6) where it is standing substantially vertically.

(4) Operation and Advantages

With the above arrangement where the lid 11 and the tray 21 carrying the disc drive section 22 are mounted onto the cabinet 2 so as to be able to turn, as the tray-interlocked pivot 15 that turns integrally with the lid 11 is made to slide along the guide groove 24, the tray 21 is turned with the lid 11 in an interlocked manner so that the disc drive 5 allows the tray 21 to move out forward in such a way that the front surface of the tray 21 is directed slightly upward when the lid 11 is opened, whereas it allows the tray 21 to move backward to restore the proper position and stand upright when the lid 11 is closed.

Therefore, since the disc drive 5 transmits the urging force of the lid spring and the gravity applied to the lid 11 when the lid 11 is opened or closed to the tray 21 by way of the tray-interlocked pivot 15 and the guide groove 24, it is possible to interlock the lid 11 with the tray 21 by means of a simple arrangement without requiring a drive motor and a large number of gears.

Particularly, since no drive motor is used for opening and closing the lid 11, the disc drive 5 can open and close the lid 11 if the power source of the CD player 1 is not activated. Thus, the disc drive 5 can interlock the lid 11 with the tray 21 without fail.

Additionally, in the first state where the lid 11 is completely closed (FIG. 6), disc drive 5 rigidly holds the tray-interlocked pivot 15 located in the first partial groove 24a of the guide groove 24 (FIG. 5) along with the lid 11 so that it is possible to limit the turning motion of the tray 21 by the tray-interlocked pivot 15 and prevent the tray 21 from jar and jolt.

At this time, since the disc drive 5 holds the tray 21 substantially to an upright position, it is possible to minimize the length of the entire disc drive 5 between the front end and the rear end thereof. In other words, it is possible to downsize the CD player 1 (FIG. 1) in terms of the distance between the front end and the rear end thereof.

Additionally, since the disc drive 5 can release the tray-interlocked pivot 15 in the turning direction by means of the second partial groove 24b of the guide groove 24 (FIG. 5) in the second state where the lid 11 is slightly opened (FIG. 7), the tray 21 is hardly turned if the lid 11 is turned. Thus, it is possible to prevent a lower part of the tray 21 from interfering with the rear surface of the lid 11.

Still additionally, when the tray-interlocked pivot 15 is turned integrally with the lid 11 in the third state where the lid is opened to a certain extent (FIG. 8), the disc drive 5 can receive the force applied by the tray-interlocked pivot 15 by means of the inner lateral surfaces of the third partial groove 24c of the guide groove 24 (FIG. 5) so that it is possible to turn the tray 21 forward or backward according to the opening or closing motion of the lid 11.

Still additionally, since the tray-interlocked pivot 15 that is located in the fourth partial groove 24d of the guide groove 24 (FIG. 5) is held lying still integrally with the lid 11 in the fourth state where the lid 11 is fully opened (FIG. 9), the disc drive 5 can restrict the tray 21 in terms of turning so that the tray 21 is held lying still in a state where it is forwardly edged out and the disc drive 5 can receive the force applied by the user to push the disc 9 against the tray 21 without releasing it.

At this time, the disc drive 5 allows the front surface of the tray 21 to turn slightly upward by allowing a lower part of the tray 21 to forwardly edge out so that the user can put the disc 9 into the CD player 1 with ease.

Furthermore, when the user 9 puts the disc 9 into the CD player 1, the disc drive 5 causes the disc 9 to approach the tray 21 along a normal line relative to the tray 21 so that the user can secure the disc 9 on the disc rotating table 22B simply by pushing it against the tray 21 in the same direction. In other words, the user may be not required to take an unnatural action of bringing the disc 9 obliquely toward the tray 21 in a direction other than that of a normal line relative to the tray 21 and then pushing it in the direction of the normal line.

With the above-described arrangement, when the lid 11 is opened or closed relative to the cabinet 2, the disc drive 5 causes the tray-interlocked pivot 15 to slide along the guide groove 24 and transmits the force applied to the lid 11 to the tray 21 by way of the tray-interlocked pivot 15 and the guide groove 24. Therefore, the tray 21 is turned with the lid 11 in an interlocked manner and a lower part of the tray 21 is edged out forward to turn the front surface of the tray 21 slightly upward when the lid 11 is opened, whereas the lower part of the tray 21 is pulled backward to restore the original upright position when the lid 11 is closed. Thus, it is possible to interlock the lid 11 with the tray 21 by means of a simple arrangement without requiring a drive motor and a large number of gears. Then, it is possible to realize a disc drive apparatus that allows the user to put a disc into it and take the disc away from it with ease by means of a simple arrangement.

(5) Other Embodiments

While the tray 21 is interlocked with the lid 11 by way of the tray-interlocked pivots 15 (15L and 15R) and the guide grooves 24 (24L and 24R) in the above described embodiment, the present invention is by no means limited thereto and the tray 21 may alternatively be interlocked with the lid 11 by way of some other power transmission technique such as a gear mechanism and/or a link mechanism.

While the above-described embodiment is a so-called standing type disc drive 5 adapted to replay a disc 9 that is substantially vertically standing, the present invention is by no means limited thereto and the present invention is also applicable to a so-called horizontal type disc drive adapted to replay a disc 9 that is substantially horizontally lying. If such is the case, the user can put a disc 9 into the disc drive with ease as the disc drive drives the tray to edge above.

While two tray-interlocked pivots 15 (15L and 15R) are arranged at the left and right sides of the lid 11 and two guide grooves 24 (24L and 24R) are arranged at the left and right sides of the tray 21 in the above described embodiment, the present invention is by no means limited thereto and, only a single tray-interlocked pivot 15 and a single guide groove 24 may alternatively be arranged at the left or right side of the lid 11 and at the left or right side of the tray 21 respectively.

While the present invention is applied to the disc drive 5 for replaying a CD in the above described embodiment, the present invention is by no means limited thereto and the present invention may alternatively be applied to a DVD player for replaying a DVD (digital versatile disc) or some other electronic appliance adapted to record data on and/or reproduce data from a disc recording medium of any of various types.

While the present invention is applied to the disc drive 5 mounted on a portable CD player 1 in the above-described embodiment, the present invention is by no means limited thereto and the present invention may alternatively be applied to a disc drive of various types of CD players, such as a so-called stationary type and portable type.

While a ball chucking mechanism is incorporated into the disc chuck section 22A of the disc drive section 22 in the above described embodiment, the present invention is by no means limited thereto and it may alternatively be so arranged that a mechanism for rigidly holding a disc 9 is not incorporated into the disc drive section 22 and, for example, disc pushing mechanism may be provided on the rear surface of the lid 11 so as to push the disc 9 against the disc rotating table 22B and hold it there. If such is the case, the disc drive section 22 may be mounted not on the tray 21 but in the cabinet 2.

While the lid 11 is opened by the urging force of the lid spring and closed manually by the user in the above described embodiment, the present invention is by no means limited thereto and it may alternatively be so arranged that the lid 11 is opened and closed by means of drive force of a power source such as a drive motor. If such is the case, a disc drive apparatus according to the invention can have a simplified mechanism because the drive motor may be required only to open and close the lid 11 and the tray 21 is turned with the lid 11 in an interlocked manner by way of the tray-interlocked pivots 15 and the guide grooves 24.

Furthermore, while the above described embodiment of disc drive apparatus, or the disc drive 5, has a lid 11 that is provided with tray-interlocked pivots 15 as opening/closing motion transmitting mechanism and a tray 21 that is disc holding mechanism provided with guide grooves 24 as lid turning mechanism, the present invention is by no means limited thereto and a disc drive apparatus according to one embodiment of the invention may alternatively has a cabinet having a different configuration, a lid also having a different configuration and provided with opening/closing motion transmitting mechanism and disc holding mechanism having a different configuration and provided with lid turning mechanism.

The present invention is applicable not only to CD players but also to electric appliances of various different types adapted to record data on and reproduce data from a disc recording medium.

It should be understood by those skilled in the art that various modifications, combinations, sub-combinations and alterations may occur depending on design requirements and other factors insofar as they are within the scope of the appended claims or the equivalents thereof.

What is claimed is:

1. A disc drive apparatus comprising:
   a disc holding mechanism rotatably supported relative to a cabinet and adapted to hold a disc recording medium, and
   a lid supported relative to the cabinet so as to be opened and closed freely and adapted to cover and protect disc holding mechanism in a closed state, wherein:
   the lid includes an opening/closing motion transmitting mechanism for transmitting an opening/closing motion of the lid to the disc holding mechanism; and
   the disc holding mechanism includes a lid turning mechanism for receiving the opening/closing motion of the lid transmitted thereto by way of the opening/closing motion transmitting mechanism and for driving the disc holding mechanism to turn and move outward as a motion interlocked with the opening motion of the lid and to move inward as a motion interlocked with the closing motion of the lid, the lid turning mechanism includes a guide groove having a first partial groove, a second partial groove, a third partial groove, and a fourth partial groove in which each of the first partial groove, the second partial groove, the third partial groove, and the fourth partial groove has a profile different from each other.

2. The apparatus according to claim 1, wherein:
   the opening/closing motion transmitting mechanism is formed by an interlocked pivot adapted to turn in response to the opening/closing motion of the lid and to slide in the guide groove.

3. The apparatus according to claim 2, wherein
the guide groove is formed as to restrict the disc holding mechanism in a turning motion by the interlocked pivot in the closed state of the lid.

4. The apparatus according to claim 2, wherein
the guide groove is formed to prevent the disc holding mechanism from turning by the interlocked pivot in a state where the lid is opened by less than a predetermined angle relative to the cabinet regardless of the opening/closing motion of the lid.

5. The apparatus according to claim 2, wherein
the guide groove is formed to allow the disc holding mechanism to turn by the interlocked pivot in a state where the lid is opened by not less than a predetermined angle relative to the cabinet in a manner interlocked with the opening/closing motion of the lid.

6. The apparatus according to claim 2, wherein
the guide groove is formed to restrict the disc holding mechanism in a turning motion by the interlocked pivot in the open state of the lid.

7. The apparatus according to claim 1, wherein
the disc holding mechanism includes a disc drive section for driving the disc recording medium incorporated therein.

* * * * *

UNITED STATES PATENT AND TRADEMARK OFFICE
CERTIFICATE OF CORRECTION

| | |
|---|---|
| PATENT NO. | : 7,340,755 B2 |
| APPLICATION NO. | : 11/171552 |
| DATED | : March 4, 2008 |
| INVENTOR(S) | : Yuichi Sasaki |

It is certified that error appears in the above-identified patent and that said Letters Patent is hereby corrected as shown below:

Column 1, line 44, "having disc" should read --having a disc--;
Column 1, line 49, "with" should read --with an--;
Column 1, line 53, "with lid" should read --with a lid--;
Column 1, line 64, "with opening" should read --with an opening--;
Column 2, line 5, "with opening" should read --with an opening--;
Column 2, line 9, "and allows" should read --and which allows--;
Column 5, line 26, "sates" should read --states--;
Column 5, line 59, "reads" should read --read--;
Column 6, line 2, "extend" should read --extends--;
Column 8, line 61, "user 9 puts" should read --user puts--;
Column 8, line 66, "may be not" should read --may not be--;
Column 9, line 66, "disc pushing" should read --a disc-pushing--;
Column 10, line 22, "has a" should read --have a--;
Column 10, line 44-45, "disc holding" should read --the disc-holding--.

Signed and Sealed this

Thirty-first Day of March, 2009

JOHN DOLL
*Acting Director of the United States Patent and Trademark Office*